United States Patent [19]
Warmka et al.
[11] 3,970,433
[45] July 20, 1976

[54] RECORDING SURFACE SUBSTRATE

[75] Inventors: Gary Paul Warmka, Minneapolis; James Dan Hill, Bloomington, both of Minn.

[73] Assignee: Control Data Corporation, Minneapolis, Minn.

[22] Filed: June 23, 1975

[21] Appl. No.: 589,101

[52] U.S. Cl. .......... 29/194; 29/199
[51] Int. Cl.² .......... B32B 15/00
[58] Field of Search .......... 29/199, 194, 195

[56] References Cited

UNITED STATES PATENTS

| | | | |
|---|---|---|---|
| 3,471,272 | 10/1969 | Wilhelm et al. | 29/194 |
| 3,595,630 | 7/1971 | Wilhelm et al. | 29/195 |
| 3,702,239 | 11/1972 | Nagy et al. | 29/195 |
| 3,738,818 | 6/1973 | Stone et al. | 29/194 |

*Primary Examiner*—L. Dewayne Rutledge
*Assistant Examiner*—E. L. Weise
*Attorney, Agent, or Firm*—Edward L. Schwarz

[57] ABSTRACT

An improved substrate on which a cobalt-magnetic recording layer may be plated and a method for producing it. The substrate includes inner and outer nickel layers with an intermediate gold layer between them. This results in a smooth surface on which a uniform and adherent cobalt recording layer can be deposited.

8 Claims, 1 Drawing Figure

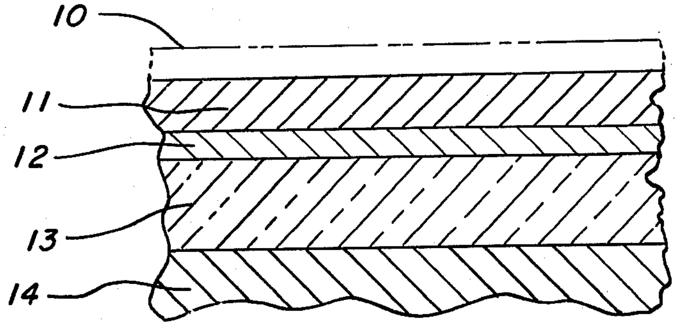
10
11
12
13
14

RECORDING SURFACE SUBSTRATE

BACKGROUND OF THE INVENTION

1. Field of the Invention

Magnetic recording devices include a magnetic recording layer in which individual bits are recorded as magnetized spots having at least two detectably different magnetic orientations. It has been discovered that a particularly valuable type of recording layer can be made from a thin coating of cobalt metal deposited on a non-magnetic substrate. Experience shows that not all non-magnetic substrates are suitable for carrying the cobalt layer. On some substrates, the adherence of the cobalt film is not sufficient to resist the mechanical stresses which ordinary use places on it, resulting in its flaking and removal from the substrate during use. In other situations, the cobalt will not form a layer of uniform coercivity, resulting in undesirable variations in the magnetic recording qualities of the cobalt layer.

2. Description of the Prior Art

U.S. Pat. No. 3,738,818 (Stone et al), having common ownership with this application, and U.S. Pat. No. 3,702,239 (Nagy et al) both teach the preparation of a substrate for a cobalt recording film comprising a nickel inner layer and a gold outer layer on which the cobalt layer is placed. In both cases, the nickel and gold layers are deposited from a chemical solution. U.S. Pat. No. 3,433,721 (Wolff) discloses the use of a sputtered gold substrate beneath a permalloy magnetic film. U.S. Pat. No. 3,348,931 (Reekstin) discloses depositing a gold film on a copper substrate, with a layer of Fe-Ni-Cu plating which serves as the magnetic recording layer. U.S. Pat. No. 3,297,418 (Firestone et al) discloses a deposited gold film on which is deposited a magnetic recording layer comprising nickel, cobalt and iron. U.S. Pat. Nos. 3,180,715 and 3,549,418 and 3,607,149 all disclose cobalt magnetic recording layers having a non-magnetic substrate layer immediately beneath.

BRIEF DESCRIPTION OF THE INVENTION

The invention is an improved substrate on which a cobalt magnetic recording layer can be deposited, and comprises an inner, non-magnetic, polished nickel layer on which is deposited a gold layer sufficiently thick to eliminate any non-uniformity in it and thin enough to avoid impairing the smoothness of the inner nickel layer. Another non-magnetic nickel layer is deposited on the gold layer. This outer nickel layer should be sufficiently thick to eliminate any discontinuity within it and thin enough to maintain the smoothness of the gold layer. A substrate so formed provides an ideal surface on which to deposit a conventional recording layer comprising cobalt.

One purpose of this invention is to provide a substrate of uniform chemical activity on which the cobalt can be chemically deposited.

A second purpose is to provide a substrate which has almost precise optical flatness.

Yet another object is to provide a substrate having high mechanical strength and forming a strong mechanical bond with the deposited cobalt to thereby increase the durability of the recording layer.

BRIEF DESCRIPTION OF THE DRAWING

The FIGURE discloses a cross section of the substrate of the invention with a typical cobalt layer on it.

DESCRIPTION OF THE PREFERRED EMBODIMENT

The cross section of the subject of this invention shown in the drawing comprises a base structure 14 which can conveniently comprise an aluminum substrate with a zinc layer thereon to provide a relatively smooth surface to which a subsequent deposition of nickel will firmly adhere. The zinc coating is usually formed by chemical immersion. Inner nickel layer 13 is then plated directly on base 14, said nickel layer of course being non-magnetic. With present technology, this practically dictates that electroless deposition of the nickel by employed. Nickel layer 13 is then polished to the geometry desired for the final outside layer. Nickel layer 13 must be initially thick enough so that after polishing, it will have sufficient mechanical strength to properly support the cobalt film while subjected to the forces created by a flying magnetic head. As a practical matter this requires initial thickness of nickel layer 13 at least 0.0005 in. and preferably 0.001 in. or more.

Gold layer 12 is plated directly on nickel layer 13. Gold layer 12 should be thick enough to be completely continuous. In present technology, this imposes a least thickness of approximately 3 microinches. On the other hand, excessive thickness of gold layer 12 is undesirable to prevent the roughness which may result thereform. As a practical matter, therefore, gold layer 12 is usually chosen to be less than 5 microinches thick. It is also preferred that gold layer 12 be electrolytically deposited since electrolytic deposition results in greater smoothness and uniformity of the gold layer. Furthermore, when electrolytic deposition is used the uniformity is less dependent on the chemical condition of nickel layer 13. The major purpose of the gold plating step is to activate nickel layer 13 partially passivated by the polishing.

Outer nickel layer 11 is plated directly onto gold layer 12, again using an electroless deposition technique to prevent magnetism therein. Experience shows that outer nickel layer 11 should be thicker than 5 microinches, again because of limitations of present technology, to insure uniformity and continuity. The difference in color between nickel layer 11 and gold layer 12 allows easy determination of film nickel layer 11 continuity. Preferrably, outer nickel layer 11 is less than 15 microinches thick, to avoid unnecessary roughness in the final surface on which cobalt layer 10 is ultimately placed. There is no advantage in plating outer nickel layer 11 to a thickness substantially greater than 5 microinches, since this merely requires additional time and expense.

This composite substrate assures the best possible surface known on which a cobalt recording layer 10 can be plated. It is difficult to assure flatness and smoothness of a nickel layer, such as layer 13, which is plated directly on a base substrate, without polishing of layer 13. But polishing passivates the surface of a plated nickel layer, rendering it unreceptive to electroless reduction of a uniform cobalt layer. Gold is one of the few materials which will plate satisfactorily on a passivated nickel surface. However, cobalt does not plate onto gold nearly as satisfactorily as it does on an activated (unpolished) nickel layer. Therefore, such an activated nickel layer 11 is provided on which a subsequent cobalt layer 10 can be satisfactorily plated with good adhesion and uniformity. Uniformity is extremely important in a cobalt recording layer since its coercivity is dependent on its thickness, and variation in coercivity across a recording surface is known to cause problems during the subsequent recording usage.

As an example, a round aluminum cylinder was treated according to this invention, to prepare for plating of a cobalt recording surface thereon rendering the cylinder usable as the drum in a drum memory system. The cylindrical surface of the drum was machined and lapped to form a uniform mat finish thereon with no visible surface defects. The entire drum was then cleaned according to standard procedures to remove all grease, dust, and other foreign matter. The drum surface was then chemically cleaned with an alkaline cleaner comprising 14 grams/liter of NS-35, Enthone non-silicated alkaline non-etch cleaner and rinsed with deionized water. The drum was then immersed in a 50% nitric acid solution, removed, and again spray rinsed with deionized water. The rotor was then immersed in a zincate solution comprising 200 ml Alumon D concentrate/liter for 45 seconds while being rotated at 30 rpm. The drum was then thoroughly rinsed again with de-ionized water.

The drum was then immersed in the following electroless nickel plating bath for three hours and continuously rotated at 7 rpm:

5.6 ml/l of 70% monohydroxy acetic acid
15 gm/l hydrous sodium citrate
7.5 gm/l anhydrous sodium acetate
30 gm/l hydrous nickel sulfate
22.5 gm/l sodium hypophosphite The above solution was adjusted to pH 4.4 ± 1 electrometric using 0.1N $H_2SO_4$. After rinsing with the deionized water and drying, the drum was heat treated for three hours at 160°C. The plated nickel surface was then lapped to a mat finish. The nickel-plated surface was then polished to near a specular finish.

The polished nickel surface was then electrolytically plated with gold using Sel Rex Autronex Cl gold process with the DC power supply voltage set at 5 V, at 10 amps./sq. ft. and plating continued for 25 sec. The drum was then rinsed with water and given a second nickel layer as described above except that the plating time was five minutes long and the plating solution was vigorously agitated throughout the cycle. The drum was then immediately transferred to the magnetic cobalt plating bath while being rotated and rinsed with water, total transfer time not exceeding 12 seconds. Thereafter, a thin gold layer was electrolytically plated on the cobalt.

Having thus described the invention, what is claimed is:

1. An improved substrate providing an area on which a cobalt magnetic recording layer may be plated, comprising:

a. an inner non-magnetic polished nickel layer on the area;

b. a deposited gold layer on the inner nickel layer sufficiently thick to eliminate non-uniformity thereof and sufficiently thin to substantially maintain the smoothness of the inner nickel layer; and c. an outer non-magnetic deposited nickel layer on the gold layer sufficiently thick to eliminate porosity therein and sufficiently thin to substantially maintain the smoothness of the gold layer.

2. The substrate of claim 1, wherein the gold layer is no thinner than approximately 3 microinches.

3. The substrate of claim 2, wherein the gold layer is no thicker than approximately 5 microinches.

4. The substrate of claim 1, wherein the outer nickel layer is no thinner than approximately 5 microinches.

5. The substrate of claim 4, wherein the outer nickel layer is no thicker than approximately 15 microinches.

6. The substrate of claim 1, wherein the inner nickel layer is a nearly specularly polished nickel layer.

7. The substrate of claim 1, wherein the gold layer is an electrolytically deposited layer.

8. The substrate of claim 7, wherein the gold layer is in the range of 3 to 5 microinches thick, and the outer nickel layer is in the range of 5 to 15 microinches.

* * * * *